(12) United States Patent
Shin

(10) Patent No.: US 8,345,312 B2
(45) Date of Patent: Jan. 1, 2013

(54) METHOD OF PRINTING A TEXT WITH AN APPARATUS USING CHANNELS

(75) Inventor: Sang Youn Shin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/333,379

(22) Filed: Dec. 21, 2011

(65) Prior Publication Data

US 2012/0162668 A1  Jun. 28, 2012

Related U.S. Application Data

(63) Continuation of application No. 12/022,389, filed on Jan. 30, 2008, now Pat. No. 8,102,570.

(30) Foreign Application Priority Data

Feb. 8, 2007  (KR) .................... 2007-13211

(51) Int. Cl.
*H04N 1/409* (2006.01)
(52) U.S. Cl. .......... 358/3.27; 358/1.1; 358/1.9; 358/532
(58) Field of Classification Search ................ 358/1.1, 358/1.9, 3.27, 500, 501, 518, 532
See application file for complete search history.

(56) References Cited

U.S. PATENT DOCUMENTS

| | | | |
|---|---|---|---|
| 4,700,399 A | 10/1987 | Yoshida | |
| 5,126,838 A | 6/1992 | Ohsawa et al. | |
| 5,165,072 A | 11/1992 | Kurita et al. | |
| 5,777,758 A | 7/1998 | Tanabe | |
| 6,084,604 A | 7/2000 | Moriyama et al. | |
| 6,196,663 B1 | 3/2001 | Wetchler et al. | |
| 6,781,720 B1 | 8/2004 | Klassen | |
| 6,924,819 B2 | 8/2005 | Nishida et al. | |
| 8,102,570 B2 * | 1/2012 | Shin ........................ | 358/3.27 |
| 2004/0150857 A1 | 8/2004 | Sawada | |
| 2006/0092223 A1 | 5/2006 | Ross et al. | |

FOREIGN PATENT DOCUMENTS

| | | |
|---|---|---|
| EP | 1 947 838 A2 | 7/2008 |
| JP | 2005-178178 A | 7/2005 |

OTHER PUBLICATIONS

Chinese Office Action issued Mar. 8, 2010 in corresponding Chinese Patent Application 200810210358 1.
European Search Report dated Mar. 3, 2011 in corresponding European Patent Application 08101084.5.

* cited by examiner

*Primary Examiner* — Thomas D Lee
(74) *Attorney, Agent, or Firm* — Staas & Halsey LLP

(57) ABSTRACT

A method of printing a text with an apparatus using channels is provided. The method includes determining whether print data corresponds to a specified text by determining similarities between channels of print data, and determining a degree of flatness of one of the channels, searching for a boundary area in the print data if the print data is determined to correspond to the specified text, and reducing some of the channels at the boundary area, and compensating for the one of the channels by a density of the reduced channels if the print data is determined to correspond to the specified text.

9 Claims, 7 Drawing Sheets

COMPOSITE BLACK   C CHANNEL   M CHANNEL   Y CHANNEL   K CHANNEL

FIRST IMAGE BEFORE IMAGE
DISTORTION COMPENSATION

SECOND IMAGE AFTER IMAGE
DICTION COMPENSATION

METHOD OF PRINTING A TEXT WITH AN APPARATUS USING CHANNELS

CROSS-REFERENCE TO RELATED APPLICATION

This application is a continuation application of application Ser. No. 12/022,389, filed Jan. 30, 2008 now U.S. Pat. No. 8,102,570, and is related to and claims priority to Korean Patent Application No. 2007-13211, filed on Feb. 8, 2007 in the Korean Intellectual Property Office, the disclosures of which are incorporated herein by reference.

BACKGROUND OF THE INVENTION

1. Field of the Invention

Aspects of the present invention relate to a method of controlling a color image forming apparatus, and more particularly to a method of controlling a color image forming apparatus to compensate for an output image distortion caused by mis-registration during the printing operation of a color document.

2. Description of the Related Art

Generally, an image forming apparatus converts an image file (such as a user's document created by an application program or an image captured by a user's digital camera) into encoded data, and prints the encoded data on a print medium (such as paper) so that the user can view the image. Examples of an image forming apparatus include a printer, a photocopier, a facsimile machine, a multi-functional product, etc.

An image forming apparatus capable of printing a color image includes a variety of toners (e.g., Cyan, Magenta, Yellow, and Black toners). Different colors of the print data are implemented by the combination of the above-mentioned toners having different colors, and are then printed on the print medium.

Unlike a black-and-white printer (also called a mono printer), the above-mentioned color image forming apparatus overwrites some colors on a single print medium several times in order to print a desired color image on the print medium. In this case, the color image forming apparatus has difficulty in correctly printing individual colors at desired positions due to a variety of factors resulting from printing a variety of colors on a single print medium. This problem is hereinafter referred to as a mis-registration.

Particularly, color distortion by which color dots disperse in all directions becomes serious at a boundary between composite black texts due to the mis-registration.

Generally, attributes of the print data are classified into an image, a graphic, and a text. Specifically, in the case of a composite black text, if the print data is determined to be a text, the image is printed in pure black. However, if the attributes of the print data are determined to be of an image, the black text is printed in composite colors. For example, if the color image forming apparatus based on four colors (i.e., C, M, Y, and K) determines the attributes of the print data to be of an image, the black text is printed in four colors (C, M, Y, and K). In this case, color dots having different colors may disperse in the vicinity of a text boundary due to the mis-registration, and the locations of the C, M, Y, and K dots on the screen are different from those of the printed dots. In other words, the C, M, Y, and K dots may be printed in the wrong locations due to mechanical errors resulting in the dispersion of the color dots. Accordingly, the desired image is distorted by the mis-registration, resulting in a deterioration of the printed image quality.

SUMMARY OF THE INVENTION

Several aspects and exemplary embodiments of the present invention provide a method of controlling a color image forming apparatus to reduce an image distortion at the boundary of a composite black text resulting from a mis-registration, thereby increasing the quality of a printed image.

Additional aspects and/or advantages of the invention will be set forth in part in the description which follows and, in part, will be obvious from the description, or may be learned by practice of the invention.

According to an aspect of the present invention, there is provided a method of controlling a color image forming apparatus that prints a composite black text using cyan (C), magenta (M), yellow (Y), and black (K) channels, the method including: determining whether print data corresponds to a composite black text; if the print data corresponds to the composite black text, searching for a boundary area in the print data; and reducing the C, M, and Y channels at the boundary area, and compensating for the K channel by a density of the reduced C, M, and Y channels.

According to another aspect of the present invention, there is provided a method of controlling a color image forming apparatus that prints a composite black text using cyan (C), magenta (M), yellow (Y), and black (K) channels, the method including: determining whether patterns of the C, M, Y, and K channels in print data are identical to each other, and determining whether the K channel is flat; determining that the print data corresponds to a composite black text if the patterns of the C, M, Y, and K channels are identical and the K channel is flat; if the print data corresponds to the composite black text, searching for a boundary area in the print data; and reducing the C, M, and Y channels at the boundary area, and compensating for the K channel by a density of the reduced C, M, and Y channels.

According to another aspect of the present invention, there is provided a method of controlling a color image forming apparatus that prints a composite black text using cyan (C), magenta (M), yellow (Y), and black (K) channels, the method including: searching for a boundary area in print data if the print data is determined to correspond to a composite black text; and reducing the C channel, the M channel, and the Y channel at the boundary area, and compensating for the K channel by a density of the reduced C, M, and Y channels if the print data is determined to correspond to the composite black text.

According to another aspect of the present invention, there is provided a color image forming apparatus that prints a composite black text using cyan (C), magenta (M), yellow (Y), and black (K) channels, the apparatus including: a control unit to search for a boundary area in print data if the print data is determined to correspond to a composite black text, to reduce the C channel, the M channel, and the Y channel at the boundary area, and to compensate for the K channel by a density of the reduced C, M, and Y channels.

In addition to the exemplary embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of exemplary embodiments and the claims when read in connection with the accompanying drawings, all forming a part of the disclosure of this invention. While the following written and illustrated disclosure focuses on disclosing exemplary embodiments of the invention, it should be clearly understood that the same is by way of illustration and example only and that the invention is not limited thereto. The spirit and scope of the present invention are limited only by the terms of the appended claims.

DETAILED DESCRIPTION OF THE EMBODIMENTS

Figure 1:
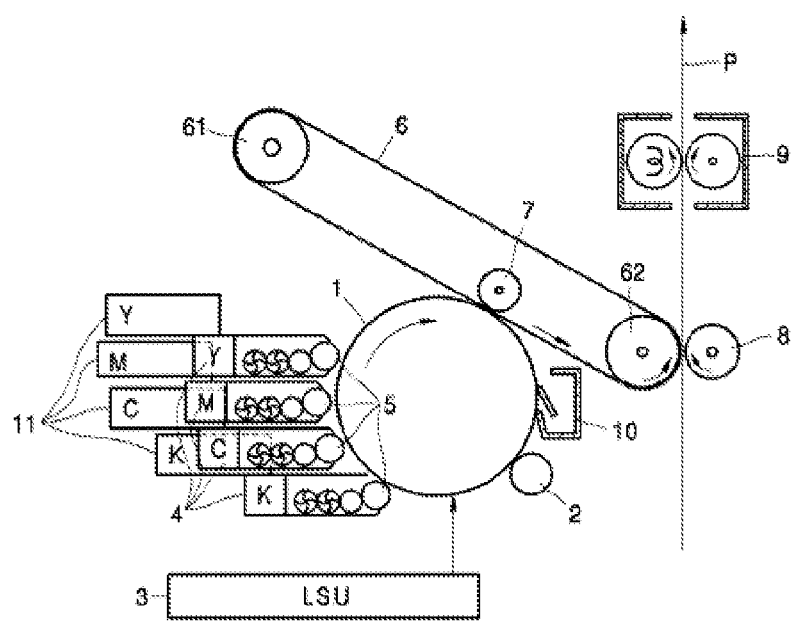
FIG. 1 is a structural diagram illustrating an image forming apparatus according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a structural diagram illustrating an image forming apparatus according to an exemplary embodiment of the present invention. Referring to FIG. 1, the color image forming apparatus includes a photoconductive drum 1, a charged roller 2, an exposure unit 3, a developing cartridge 4, an intermediate transfer belt 6, a first transfer roller 7, a second transfer roller 8, and a fixing unit 9.

The photoconductive drum 1 is configured such that a photoconductive layer is formed at a circumference of a cylindrical metal drum thereof. It is understood that a photoconductive belt (not shown) may be used instead of the photoconductive drum 1. The charged roller 2 is adapted to charge the photoconductive drum 1 with a uniform electric potential. The charged roller 2 may rotate simultaneously while contacting the circumference of the photoconductive drum 1, and provides the photoconductive drum 1 with electric charges so that the circumference of the photoconductive drum 1 is charged with a uniform electricity. It is understood that a corona discharger (not shown) may be used instead of the charged roller 2. The exposure unit 3 transmits an optical signal corresponding to image information on the charged photoconductive drum 1 so that an electrostatic latent image is formed thereon. The exposure unit may be a laser scanning unit (LSU) that uses a laser diode as a light source.

According to an aspect of the present invention, the color image forming apparatus uses four toners (i.e., cyan (C) toner, magenta (M) toner, yellow (Y) toner, and black (K) toner) to print the color image. For the convenience of description and better understanding of the present invention, the above-mentioned four toners are denoted by reference characters "C," "M," "Y," and "K," respectively, to distinguish individual toners from each other according to individual colors.

The color image forming apparatus includes four toner cartridges (11C, 11M, 11Y, and 11K) including the C, M, Y, and K toners, respectively: Furthermore, the color image forming apparatus includes four developers (4Y, 4M, 4C, and 4K) receiving individual toners from the toner cartridges (11Y, 11M, 11C, and 11K), respectively, and developing an electrostatic latent image formed on the photoconductive drum 1. Each developer 4 includes a developing roller 5 in a processing direction of the photoconductive drum 1. The developer 4 is spaced apart from the photoconductive drum 1 by a predetermined distance corresponding to a developing gap. The developing gap may, although not necessarily, be set to several tens or hundreds of microns. In the case of a multipath-type color image forming apparatus, a plurality of developers 4 may be sequentially operated.

A developing bias signal is applied to the developing roller of the selected developer (e.g., 4Y), and is not applied to the remaining developers (e.g., 4M, 4C, and 4Y). Rather, a developing-prevention bias signal may be applied to the remaining developers (e.g., 4M, 4C, and 4Y). Furthermore, only the developing roller 5 of the selected developer (e.g., 4Y) rotates, and the remaining developers (e.g., 4M, 4C, and 4K) do not rotate.

The intermediate transfer belt 6 is supported by supporting rollers 61 and 62, and may travel with the same traveling linear velocity as the rotational linear velocity of the photoconductive drum 1.

The length of the intermediary transfer belt 6 may be greater than or equal to the length of a maximum-sized print medium P used for the image forming apparatus. The first transfer roller 7 is arranged to face the photoconductive drum 1. A first transfer bias signal for copying the toner image developed on the photoconductive drum 1 to the intermediate transfer belt 6 is applied to the first transfer roller 7. The second transfer roller 8 is arranged to face the intermediate transfer belt 6 and is spaced apart from the intermediate transfer belt 6 while the toner image is transferred from the photoconductive drum 1 to the intermediate transfer belt 6. When the toner image is completely transferred to the intermediate transfer belt 6, the second transfer roller 8 contacts the intermediate transfer belt 6 at a predetermined pressure. A second transfer bias for transferring the toner image to the print medium P is applied to the second transfer roller 8. Then, a cleaner 10 removes toner left on the photoconductive drum 1 after the transferring action.

A method of forming a color image according to the above-mentioned configuration will hereinafter be described in detail. An optical signal corresponding to Y-color image information is transferred from the exposure unit 3 to the photoconductive drum 1 charged with uniform electricity by the charged roller 2. Accordingly, an electrostatic latent image corresponding to the Y-color image is formed on the photoconductive drum 1. A developing bias is applied to the developing roller 5 of the Y-developer (4Y) so that the Y-color toner image is formed on the photoconductive drum 1. Then, the Y-color toner image is transferred to the intermediate transfer belt 6 by the first transfer bias applied to the first transfer roller 7.

After the Y-color toner image corresponding to a single page is completely transferred to the intermediate transfer belt 6, the exposure unit 2 outputs an optical signal corresponding to the M-color image information to the photoconductive drum 1 re-charged with the uniform electricity by the charged roller 2, so that an electrostatic latent image corresponding to the M-color image is formed on the photoconductive drum 1. The M-color toner is applied to the electrostatic latent image by the M-color developer (4M), and is then developed. The M-color toner image formed on the photoconductive drum 1 is transferred to the intermediate transfer belt 6, so that the M-color toner image overlaps with the previously transferred Y-color toner image.

The above-mentioned process may also be applied to the C and K colors. In this case, the color toner image is formed in which the Y-, M-, C-, and K-toner images overlap each other. This color toner image is transferred to the print medium P from the intermediate transfer belt 6 and the second transfer roller 8 by the second transfer bias. The fixing unit 9 applies heat and pressure on the color toner image, so that the image is fixed onto the print medium P.

According to aspects of the present invention, the above-mentioned color image forming apparatus prevents a composite black text image from being distorted by mis-registration, prevents a blurred color from being generated at a boundary of the composite black text, and prevents several color dots from dispersing in various directions at the boundary of the composite black text. In the case of the document printing mode, some colors are printed on a single print medium several times in order to print a desired image, as opposed to a black-and-white printer (i.e., a mono printer) in which the black color is printed on a single print medium only once. As a result of the plurality of colors that are printed to be overlapped with each other on only one print medium, the color image forming apparatus has difficulty in correctly printing individual colors at desired locations due to a variety of factors. This problem is called a mis-registration. Aspects of the present invention provide a software method (instead of using a hardware method) for pre-processing printing data so that the print data can be printed similar to an original image irrespective of mechanical errors.

Figure 2:
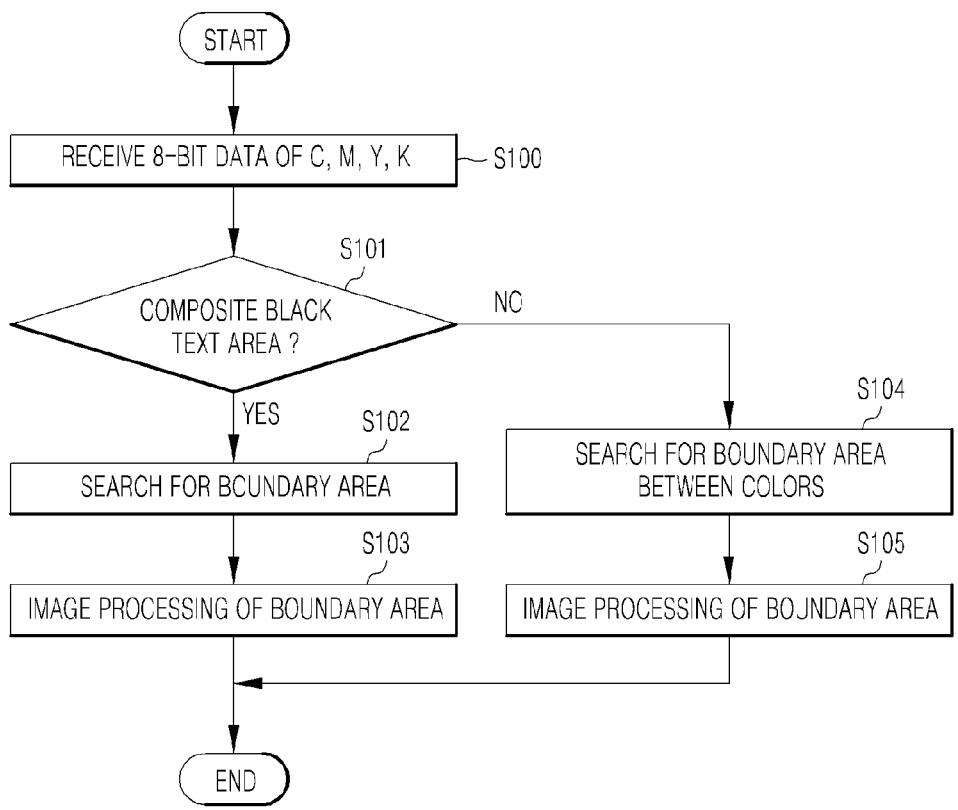
FIG. 2 is a flow chart illustrating a method of controlling a color image forming apparatus according to an exemplary embodiment of the present invention.

FIG. 2 is a flow chart illustrating a method of controlling a color image forming apparatus according to an exemplary embodiment of the present invention. Referring to FIG. 2, the color image forming apparatus receives color print data required to print the color image, and receives CMYK data of 8 bits in operation S100. Then, the color image forming apparatus determines whether the received color print data corresponds to a composite black text in operation S101. If the received color print data is determined to correspond to the composite black text (operation S101), the color image forming apparatus searches for a boundary area of the composite black text using a Laplacian filter in operation S102, and performs image-processing of the boundary area so as to prevent the image from being distorted by mis-registration in operation S103. If the received color print data is determined to not correspond to the composite black text (operation S101), the color image forming apparatus extracts a specific area in which the directions of edges among colors are opposite to each other in operation S104, so that a boundary area among colors is searched for. The color channels of the boundary area are extended and emphasized, and the boundary area is image-processed so as to not be distorted by mis-registration in operation S105.

Figure 3:
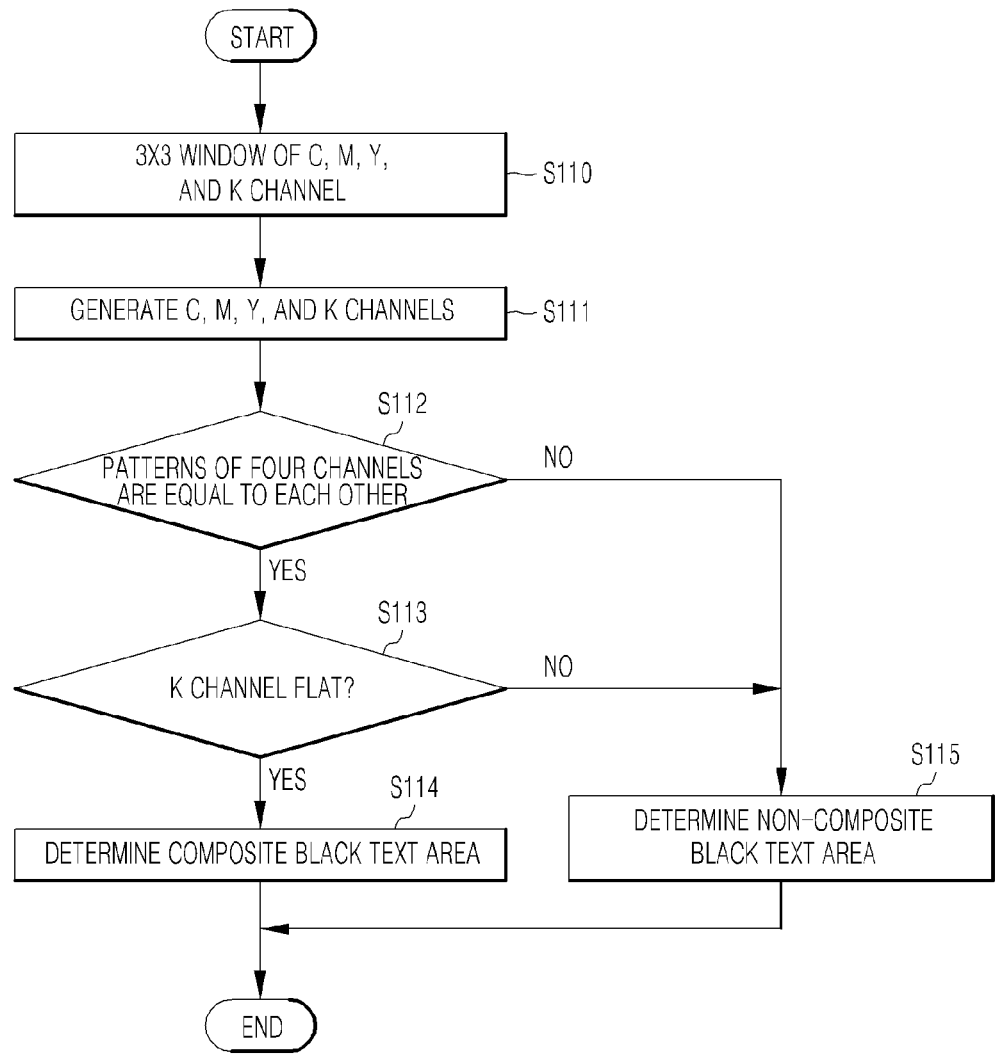
FIG. 3 is a flow chart illustrating a method of determining a composite black text according to an exemplary embodiment of the present invention.

FIG. 3 is a flow chart illustrating a method of determining a composite black text of FIG. 2 according to an exemplary embodiment of the present invention. Referring to FIG. 3, a 3×3 window for the C, M, Y, and K channels is established in operation S110. A bitmap is created by a threshold value in operation S111 in order to determine whether the patterns among the C, M, Y, and K channels are identical to each other in operation S112. If the patterns among the C, M, Y, and K channels are identical to each other (operation S112), it is determined whether the K channel is flat in operation S113. If the K channel is flat (operation S113), the composite black text is determined in operation S114. In more detail, if the patterns among the C, M, Y, and K channels are identical to each other due to characteristics of the composite black text, the K channel is flat. If the K channel is not flat (operation S113), a non-composite black text is determined in operation S115.

Figure 4:
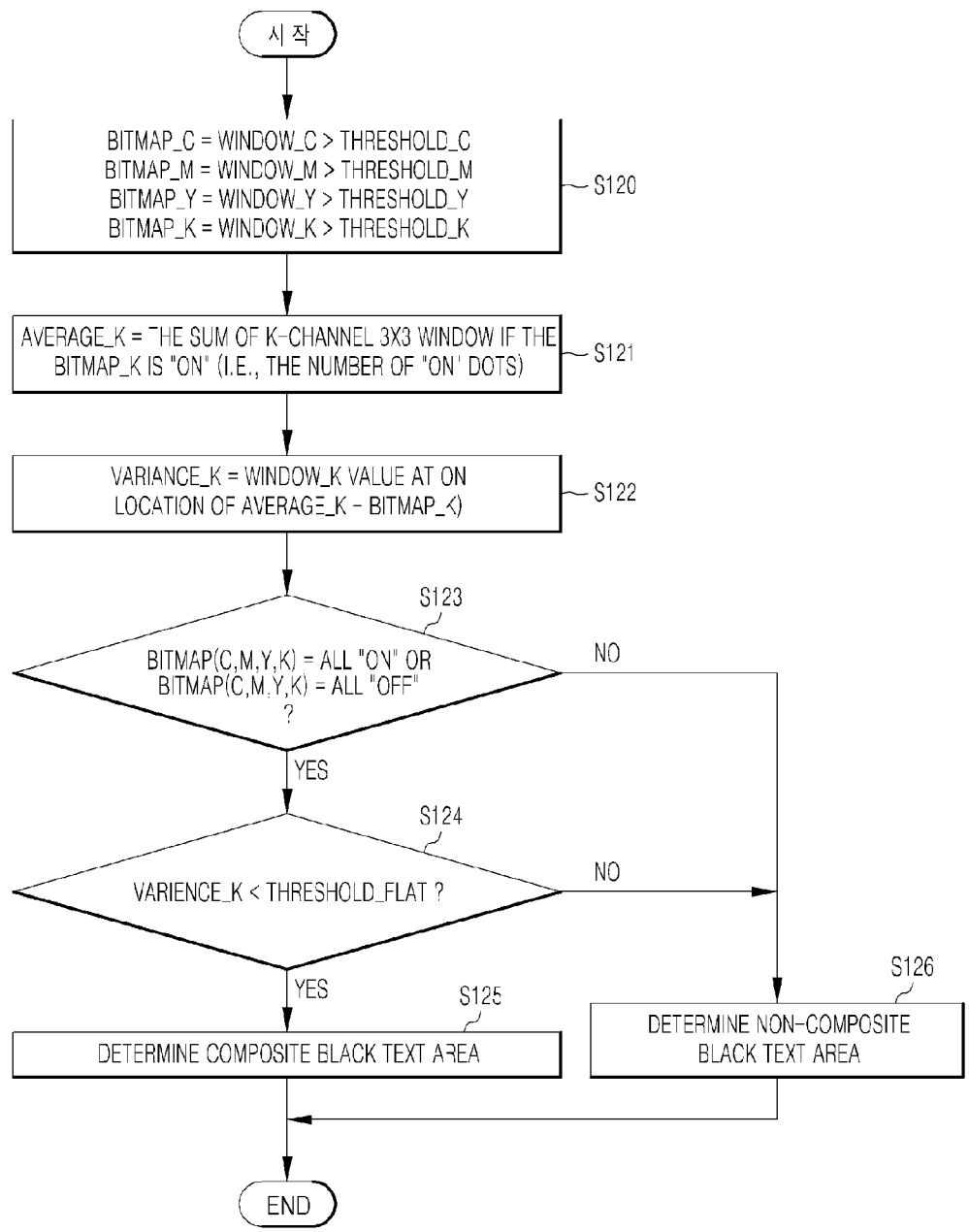
FIG. 4 is a flow chart illustrating a method of determining a composite black text according to an exemplary embodiment of the present invention.

FIG. 4 is a flow chart illustrating a method of determining a composite black text according to an exemplary embodiment of the present invention. Referring to FIG. 4, in association with the 3×3 window of the C, M, Y, and K channels, a 3×3 bitmap associated with the 3×3 window is created by a threshold value in operation S120.

An average value of window values formed at ON locations of the K-channel bitmap from among the K-channel 3×3 window values is calculated in operation S121. A variance value (Variance_K) is calculated on the basis of the average value and the ON pixel values contained in the window in operation S122.

Thereafter, it is determined whether the C, M, Y, and K channel bitmaps created in operation S120 have the same patterns. Specifically, if all four channels are switched ON or all four channels are switched OFF at all pixel locations of the 3×3 window, it is determined that the patterns are equal to each other in operation S123. Also, in operation S124, it is determined whether the K channel is flat according to the variance value (Variance_K) calculated in operation S122. Specifically, if the variance value (Variance_K) is less than a predetermined value (Threshold_Flat) in operation S124, it is determined that the K channel is flat.

If the aforementioned two conditions are satisfied (all four channels are "On" or "Off" and the K channel is flat), the composite black text is determined in operation S125. In more detail, the color image forming apparatus searches for the composite black text by estimating a degree of coincidence among patterns of the four channels and a degree of planarization of the K channel. In particular, the color image forming apparatus can search for the composite black text because the composite black text has the same C, M, Y, and K patterns and has a low deviation among dot levels of dot-ON locations of the "ON" K channel. Therefore, the color image forming apparatus searches for the composite black text using characteristics of the composite black text.

If either one of the above-mentioned two conditions is not satisfied (all four channels are "On" or "Off" or the K channel is flat), the non-composite black text is determined in operation S126.

Figure 5:
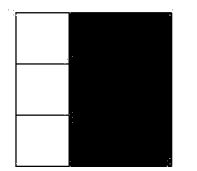
FIG. 5 is a conceptual diagram illustrating a method of determining a composite black text in a 3×3 window according to an exemplary embodiment of the present invention.
Figure 5:
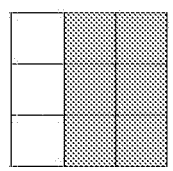
Figure 5:
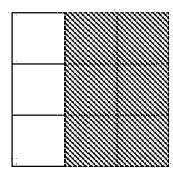
Figure 5:
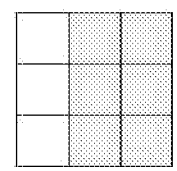
Figure 5:
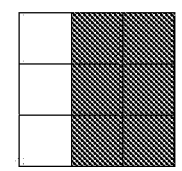

FIG. 5 is a conceptual diagram illustrating a method of determining a composite black text in a 3×3 window according to an exemplary embodiment of the present invention. As can be seen from FIG. 5, the C, M, Y, and K channels overlap with each other to form the composite black area. The C, M, Y, and K channels have the same "dot-ON" and "dot-OFF" locations, and have a low deviation among dot values of the ON area of the K channel. Accordingly, the composite black text can be determined based on the C, M, Y, and K channels.

Figure 6:
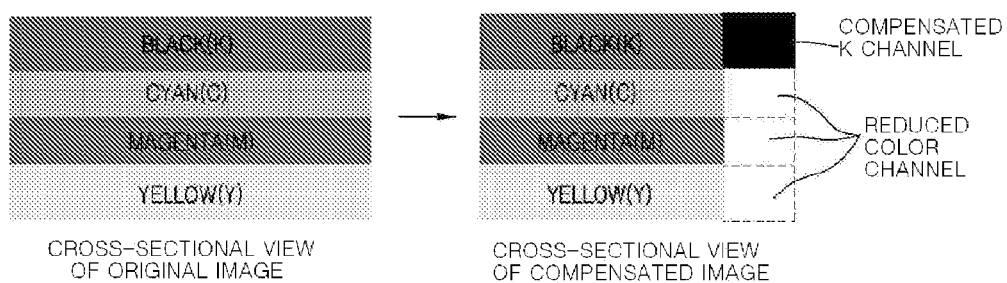
FIG. 6 is a conceptual diagram illustrating a method of reducing C, M, and K areas at the boundary of the composite black text so that only the K channel is left at the outermost boundary according to an exemplary embodiment of the present invention.

Accordingly, if the composite black text is determined, boundary area of the composite black text is found using the Laplacian filter. As can be seen from FIG. 6, the C, M, and Y areas are removed from the found boundary area. Only the K channel is left on the outermost boundary of the composite black text. In this case, the K channel is compensated as much as the density of the removed C, M, and Y areas. In other words, the C, M, and Y values are respectively set to "0" at the boundary area and the K value is set to K+density (CMY)*W, so that the image distortion is compensated.

Figure 7:
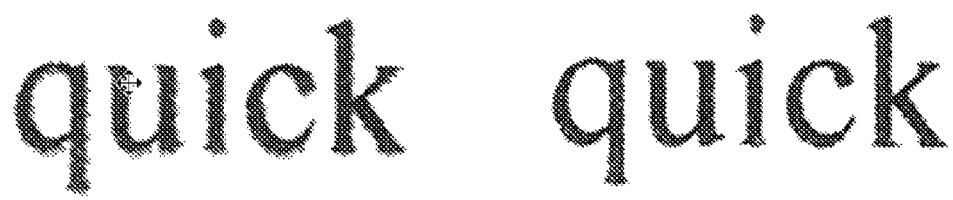
FIG. 7 shows a comparison result between first data created before an image distortion compensation of the composite black text "quick" and second data created after the image distortion compensation of the composite black text "quick" according to an exemplary embodiment of the present invention.

FIG. 7 shows a comparison result between a first image created before the image distortion compensation of the composite black text "quick" and a second image after the image distortion compensation of the composite black text "quick" according to an exemplary embodiment of the present invention. As can be seen from FIG. 7, the first image includes the C, M, and Y colors, which disperse in the vicinity of the composite black text by the mis-registration. However, in the case of the second image including the compensated image distortion, the image distortion caused by the C, M, and Y channel colors is lower in the vicinity of the composite black text.

As is apparent from the above description, aspects of the present invention prevent an image distortion from occurring in the vicinity of composite black text due to mis-registration, in which C, M, Y, and K channels are printed in incorrect locations. Specifically, aspects of the present invention remove the C, M, and Y areas from the boundary area of the composite black text to reduce the C, M, and Y areas. Furthermore, aspects of the present invention allow only the K channel to be left on the outermost boundary of the composite black text and compensate for the K channel by the density of the reduced C, M, and Y areas. Accordingly, the image distortion generated at the boundary of the composite black text is compensated for, resulting in increased image quality of the printed image of the composite black text.

While there have been illustrated and described what are considered to be exemplary embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, determining whether the K channel is flat may occur before or simultaneous to determining whether all four channels are ON or OFF. Accordingly, it is intended, therefore, that the present invention not be limited to the various exemplary embodiments disclosed, but that the present invention includes all embodiments falling within the scope of the appended claims.

What is claimed is:

1. A method of printing a text with an apparatus using a plurality of channels, the method comprising:
    determining whether print data corresponds to a specified text by determining similarities between a plurality of channels of print data, and determining a degree of flatness of one of the plurality of channels;
    searching for a boundary area in the print data if the print data is determined to correspond to the specified text; and
    reducing some of the plurality of channels at the boundary area, and compensating for the one of the plurality of channels by a density of the reduced channels if the print data is determined to correspond to the specified text.

2. The method as claimed in claim 1, wherein the determining of whether the print data corresponds to a composite black text comprises:
    establishing a window associated with the plurality of channels of the print data;
    generating bitmaps based on the window,
    determining, according to the generated bitmaps, whether the plurality of channels have a same pattern and whether the one of the plurality of channels is flat, and
    determining that the print data corresponds to the specified text if the plurality of channels are determined to have the same pattern and the one of the plurality of channels is determined to be flat.

3. The method as claimed in claim 2, wherein the generating of the bitmaps comprises generating bitmaps using a threshold value.

4. The method as claimed in claim 2, wherein the determining of whether the plurality of channels have the same pattern comprises:
    determining that the channels have the same pattern if the channels are simultaneously in a same status at all pixel locations of the window.

5. The method as claimed in claim 2, wherein the determining of whether the one of the plurality of channels is flat comprises:
    calculating an average value of window values generated at locations of the channel bitmap from among values contained in the window,
    calculating a variance value from pixel values of the window and the calculated average value,
    determining whether the variance value is less than a predetermined value, and
    determining that the one of the plurality of channels is flat when the variance value is less than the predetermined value.

6. The method as claimed in claim 1, wherein the reducing of the channels at the boundary area comprises reducing the channels I to 0 at the boundary area.

7. The method as claimed in claim 6, wherein the compensating for the one of the channels comprises compensating for a channel located at an outermost area of the specified text by the density of the reduced channels.

8. The method as claimed in claim 1, wherein the compensating for the one of the plurality of the channels comprises compensating for the one of the channels located at an outermost area of the specified text by the density of the reduced channels.

9. The method as claimed in claim 1, wherein the boundary area is searched for using a filter.

* * * * *

UNITED STATES PATENT AND TRADEMARK OFFICE
CERTIFICATE OF CORRECTION

PATENT NO. : 8,345,312 B2
APPLICATION NO. : 13/333379
DATED : January 1, 2013
INVENTOR(S) : Shin Page 1 of 1

It is certified that error appears in the above-identified patent and that said Letters Patent is hereby corrected as shown below:

In the Claims

Claim 6, Col. 8, Line 44, delete "channels I to 0" and insert -- channels 1 to 0 --, therefor.

Signed and Sealed this
Fifteenth Day of October, 2013

Teresa Stanek Rea
*Deputy Director of the United States Patent and Trademark Office*